INVENTOR.
Eugene L. O'Meara, Jr.

United States Patent Office 3,533,905
Patented Oct. 13, 1970

3,533,905
FUSED-CAST COMPOSITE REFRACTORY BODIES AND PROCESS OF PRODUCING SAME
Eugene L. O'Meara, Jr., Jamestown, N.Y., assignor, by mesne assignments, to The Carborundum Company, Niagara Falls, N.Y., a corporation of Delaware
Filed Feb. 13, 1967, Ser. No. 615,603
Int. Cl. C04b 35/48, 35/62, 39/00
U.S. Cl. 161—193
8 Claims

ABSTRACT OF THE DISCLOSURE

Fused-cast, composite refractory bodies substantially free from internal pores or shrinkage cavities and with improved uniformity of internal structure are formed by filling the interior of a partially cooled fused-cast, refractory body in which a pipe has developed with a molten refractory material having a melting point substantially higher than that of the material from which the rest of the body is formed whereby a portion of the interior is remelted and then permitting the filled body to cool.

BACKGROUND OF THE INVENTION

This invention relates to novel fused-cast, composite refractory bodies and is particularly concerned with an improved method of producing such bodies.

Fused-cast refractory bodies are extensively employed in building glass-melting tanks, a use in which they are far superior to any other type of refractory. In glass-melting tanks refractories are subjected not only to high temperatures, but also to corrosion and erosion by the highly reactive molten glass. Accordingly, it is very important that refractory bodies used in glass tanks should have a continuous, relatively even surface on all sides and be substantially free from internal pores or cavities, thereby minimizing attack by corrosive glass and the possibility of leakage through the bodies in use. However, because of the shrinkage that occurs in fuse-cast refractory bodies as the fused material crystallizes in cooling, shrinkage cavities known as pipes are formed in the bodies adjacent the points at which the fused material is introduced into the molds and the bodies are also often porous in the interior.

Many methods have been suggested and tried to produce fused-cast refractory bodies that have a continuous surface with no pipes and which are free from porosity in the interior thereof. For example, in U.S. Pat. No. 2,247,318 to Smyth it is suggested that the pipe in a fused-cast refractory block be packed with granular refractory material while the temperature of the block is still quite high whereby to sinter the granules of refractory material together and, presumably, bond the mass to the material of the block; in U.S. Pats. Nos. 1,700,288 and 2,327,674 to Fulcher and Smyth, respectively, processes are suggested involving the pouring of additional molten refractory material into the pipe formed in the cast body after solidification of the original casting is substantially complete; in U.S. Pat. No. 2,154,153 to Eastern lumps of a refractory material are added in the center of the body to cool the molten material and reduce shrinkage; and in U.S. Pat. No. 1,878,839 to Fulcher the use is proposed of a preformed, refractory backing member to minimize and localize voids in a fused-cast body.

However, none of the previously suggested methods of solving the problem have been entirely satisfactory. The most widely used method, that of adding additional mold volume and melt and afterward removing by sawing the oversize part of the casting containing the shrinkage cavity, loses some effectiveness during the latter stages of solidification because of the large crystals and coarse structure that develop in the central portion of the casting and the high viscosity of the remaining molten portion therein.

SUMMARY OF THE INVENTION

It is therefore an object of the present invention to provide fused-cast, composite refractory bodies which have an improved and novel internal structure and are substantially free from internal porosity and pipes. Another object of the invention is to provide a method for producing such novel bodies.

The foregoing objects are achieved according to the invention by introducing into the mold containing a partially cooled, fused-cast refractory shell, during the latter stages of solidification of said shell and after a pipe or shrinkage cavity has formed therein, a molten refractory material which is of higher melting point than that of the shell. This molten refractory material, being supplied through the font mold to the pipe formed in the shell, remelts the large crystals that tend to form in the interior of the shell and fills pores and cavities in the shell before solidifying to form a core composed primarily of said refractory material which is bonded to said shell, thus providing a structurally unitary, substantially non-porous, composite body.

BRIEF DESCRIPTION OF THE DRAWING

In the accompanying drawings which are conventionalized and to some extent schematic.

DESCRIPTION OF THE PREFERRED EMBODIMENTS

Figure 1:
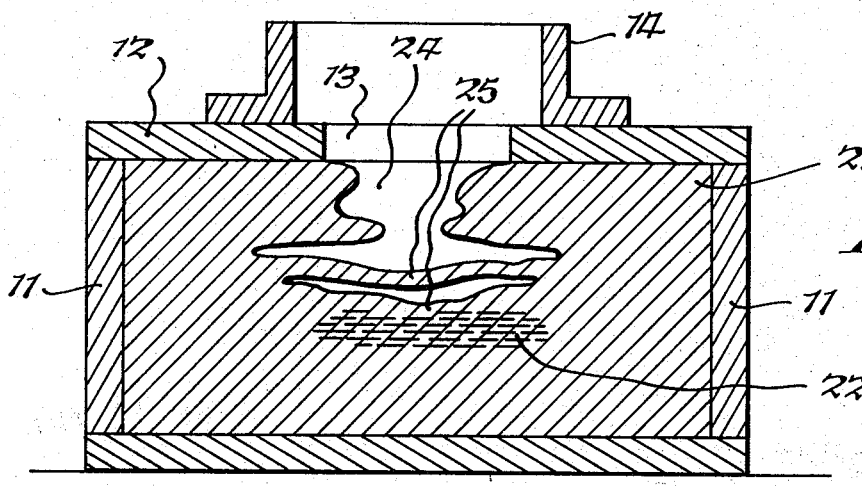
FIG. 1 is a sectional view of a mold containing a fused-cast refractory shell in which a pipe has been produced by shrinkage.

Referring to the drawings, the reference numeral 11 identifies the mold, which may be of conventional sectional construction and can be formed, for example, of plates or slabs of bonded refractory grain or graphite, which plates are held together by any suitable known means (not shown). The top plate 12 of the mold is provided with an opening 13, around which is placed a retaining ring or font mold 14, supported on the plate 12, through which suitable refractory material, previously melted in an electric arc furnace, is introduced into the mold 11 to form the refractory body.

In FIG. 1 the mold 11 is shown with the refractory material solidified around the interior surfaces of the mold as a shell 21, although a relatively small pocket 22 of still molten refractory material is shown at approximately the center of the body. Above the pocket 22 and below the opening 12 is a pipe or large void 24 which, as shown and as is frequently the case, contains thin, transverse septa or membranes 25 of solidified refractory material. Coarse crystals of the refractory material line the interior of the pipe 24 and the pocket 22. The structure illustrated in FIG. 1 is typical of that occurring during normal cooling, crystallization, and resultant shrinkage in a fused-cast refractory body.

Figure 2:
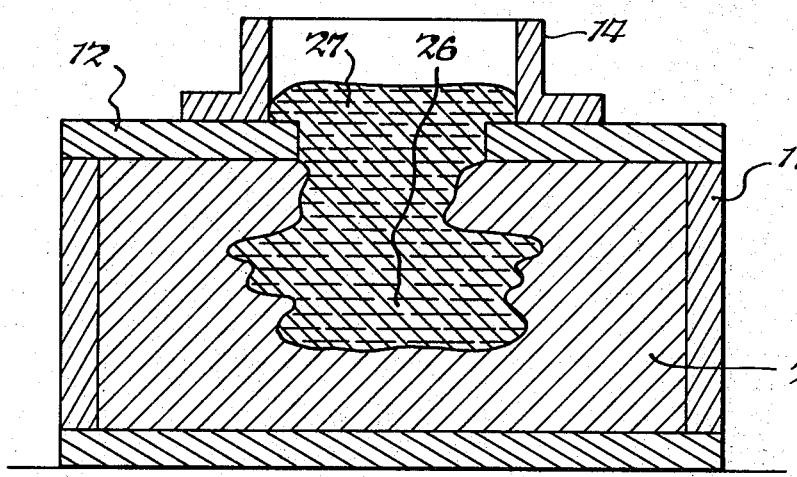
FIG. 2 is a sectional view similar to FIG. 1 showing the mold and shell after introduction of a molten, higher melting, refractory material into the mold.

In FIG. 2 there is depicted the result of pouring into the shell or body 21, in accordance with the present invention, a secondary melt, i.e. a molten refractory material of higher melting point than that of the material forming the shell 21. It will be observed that the secondary melt 26 because of its high temperature has melted the septa 25 and the internal surfaces of the shell 21, which usually are undesirably coarsely crystalline, and has filled the pipe 24 and the pockets or voids adjacent thereto.

Figure 3:
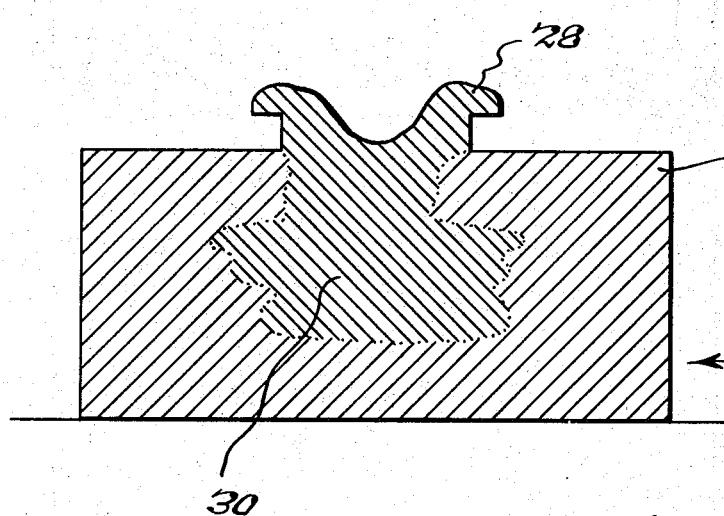
FIG. 3 is a sectional view of the completed composite refractory block after the added refractory material has solidified.

Shrinkage in the secondary melt as it cools is compensated for by the extra supply 27 of secondary melt 26 within the retaining ring or font mold 14. This is evident from the showing of FIG. 3. In this figure, the now solid refractory block 29, comprising the shell 21 and the core 30 resulting from the secondary melt, is shown removed from the mold and ready for use after removal of the font 28 and further cooling.

The following examples illustrate the present invention. Except as set forth, the procedures used were in accordance with conventional practice for the production of fused-cast refractory blocks.

Example 1

In casting a block about 305 cm. x 460 cm. x 1220 cm. for use as a glass tank throat cover block, an initial pour of about 680 kg. was made of a molten alumina-zirconia-silica refractory composition having a melting point of about 1800° C. After slowly cooling until all of the refractory melt had drained from the font mold and almost all of it had solidified in a shell of substantial thickness around the interior of the mold, a secondary melt comprising about 185 kg. of a molten, high-alumina refractory composition having a melting point of about 2080° C. was poured into the refractory shell through the font mold. Because of its higher temperature, the secondary melt caused remelting of the coarse crystals lining the pipe in the refractory shell and any septa in the pipe and filled the shrinkage cavities in the block before solidifying so that the font mold could be removed. The resultant composite block was very dense and, on sectioning, was found to be substantially free from pores or cavities and to have in the center of the block, replacing most of the coarse structure ordinarily found in a fused-cast refractory, a relatively finely crystallized core. Since the secondary melt remelted a portion of the refractory shell and since some portion of the initial pour was still molten at the time the secondary melt was introduced, the outer portion of the core has a composition not only different from the composition of the shell, but also different from at least some of the interior portion of the core.

Example 2

In casting a block approximately 305 cm. x 460 cm. x 1070 cm.

for use as a melter side wall block in a glass melting furnace, an initial pour of about 615 kg. was made of a molten alumina-zirconia-silica refractory composition having a melting point of about 1800° C. The mold with the refractory therein was slowly cooled. As cooling progressed, the refractory material shrank and crystallized as a shell of substantial thickness in the mold and the excess melt drained from the font mold. Just before the interior of the casting completely solidified, a secondary melt comprising about 160 kg. of a molten chrome-alumina refractory composition having a melting point of about 2100° C. was poured into the refractory shell through the font mold. As in Example 1, the secondary melt caused remelting of the coarse crystals lining the pipe in the refractory shell and filled the shrinkage cavities in the block before solidifying. The resultant composite block was very dense. On sectioning, it was found to be substantially free from cavities and internal pores. Instead of the coarse structure normally found in the center of a refractory casting, there was found a relatively fine crystalline core, the interior portion of which has a composition substantially like that of the secondary melt and the outer portion of which has a composition intermediate that of the original refractory material and that of the secondary melt.

In carrying out the present invention, the refractory composition used for the secondary melt should have a melting point such that the pouring temperature, which of course is above the melting point, is substantially, at least about 100° C. higher than the melting point of the refractory composition forming the shell or main portion of the refractory block. It must be also compatible with the latter so that the core formed in the block will be bonded to the outer shell of the block. Furthermore, it should solidify to form a dense, corrosion-resistant structure. Numerous such compositions are known to those skilled in the art. Thus, for example, the following combinations may be employed advantageously.

Initial pour material (shell):
    alumina-silica
    alumina-zirconia-silica
    chrome-oxide-magnesia
Secondary melt material (core):
    alumina
    alumina-zirconia-silica (high $ZrO_2$)
    chrome oxide-magnesia (high MgO)

The compositions described above are well known ones commonly employed in fused-cast refractories, various specific compositions being known and used, and form no part of the present invention. Since fused-cast refractories are ordinarily made from technical grade materials or ores and are also ordinarily modified by the addition of minor amounts of other oxides, the melting points of the compositions will, accordingly, as is well known in ceramic practice, vary and should be determined for the particular materials employed in each batch.

As will be obvious, no specific time period can be set for the introduction of the secondary melt into the shell since the proper time will depend upon many factors such, for example, as the size of the refractory body being produced, the composition thereof, the rate of cooling, and the pouring temperature of the secondary melt. However, inspection of the cooling refractory shell will indicate to those skilled in the art the time for such introduction. This preferably will be when only a small amount of molten refractory material remains in the shell and before the walls of the pipe become so cool as not to be readily remelted by the secondary melt. In general, it is desirable for the pouring temperature of the secondary melt to be at least about 200° C. higher than the melting point of the refractory shell into which it is introduced. This prevents too rapid cooling of the secondary melt with consequent failure to obtain proper remelting of the walls of the pipe in the refractory shell.

By the present invention it is possible to produce fused-cast, composite refractory bodies that have improved uniformity of internal structure since they are substantially free from voids or internal cavities, have dense structure throughout, and have a minimum of coarsely crystalline material. They also show an improved resistance to corrosion.

It will be understood that improved fused-cast refractory bodies other than glass tank blocks may be produced in accordance with the present invention. The invention is applicable to the production of fused-cast bodies of any size and/or shape where the formation of substantial shrinkage cavities is a problem. From the foregoing description, it will be obvious to those skilled in the art how to apply the invention to such production.

I claim:

1. A fused-cast, composite refractory body having an improved internal structure and substantially free from internal pores and shrinkage cavities which comprises a dense shell of substantial thickness composed of one ceramic refractory composition having a core therein composed primarily of another ceramic refractory composition of higher melting point than said first mentioned composition.

2. A refractory body as set forth in claim 1 in which the outer portion of said core is of a composition different from that of said shell and from at least some of the interior portion of said core.

3. A refractory body as set forth in claim 2 in which the composition of the outer portion of said core is intermediate between that of said shell and that of said refractory composition of higher melting point.

4. A process for producing a refractory body as defined in claim 1 which comprises casting a melt of a ceramic refractory composition in a mold; allowing solidification of said melt in said mold to form a shell of substantial thickness having a shrinkage cavity; filling, while the interior of said shell is still hot, said cavity with a secondary melt of a ceramic refractory composition having a substantially higher melting point than said first-mentioned refractory composition whereby to remelt the crystals lining said cavity and to fill said cavity; allowing said secondary melt to cool and solidify in said cavity thereby forming a solid composite body; and thereafter cooling said body.

5. A process as set forth in claim 4 in which said secondary melt is added to said cavity while a portion of said first-mentioned melt is still molten.

6. A process as set forth in claim 4 in which said secondary melt is introduced into said cavity at a temperature at least about 100° C. higher than the melting point of said first-mentioned melt.

7. A process as set forth in claim 4 in which said secondary melt is introduced into said cavity at a temperature at least about 200° C. higher than the melting point of said first-mentioned melt.

8. A process as set forth in claim 4 in which an excess of said secondary melt is employed to fill a font mold feeding into said cavity.

References Cited

UNITED STATES PATENTS

| | | | |
|---|---|---|---|
| 1,879,676 | 9/1932 | Fulcher | 52—612 X |
| 2,154,153 | 4/1939 | Easter et al. | 52—612 |
| 2,185,772 | 1/1940 | McMullen | 106—38.28 |
| 2,201,049 | 5/1940 | Moore | 65—26 |
| 2,596,990 | 5/1952 | Doyle | 65—72 |
| 2,949,704 | 8/1960 | Jacobs | 52—612 |
| 3,120,453 | 2/1964 | Fitzer et al. | 117—217 |
| 3,165,864 | 1/1965 | Shulze | 52—612 |
| 3,187,502 | 6/1965 | Stover | 161—182 X |
| 3,233,994 | 2/1966 | Penberthy | 65—66 |
| 3,261,138 | 7/1966 | Spence et al. | 52—612 |
| 3,146,281 | 8/1964 | Krystniak et al. | 264—21 |
| 3,446,643 | 5/1969 | Karcak | 161—225 X |
| 3,453,172 | 7/1969 | Faulkner | 161—182 |
| 3,459,630 | 8/1969 | D'Eustachio et al. | 65—18 X |
| 3,467,745 | 9/1969 | Lambertson et al. | 264—317 |
| 3,468,750 | 9/1969 | Pfeifer et al. | 161—206 X |
| 3,468,752 | 9/1969 | Yamamoto et al. | 161—193 X |
| 3,472,729 | 10/1969 | Sterman et al. | 161—193 X |

HAROLD ANSHER, Primary Examiner

U.S. Cl. X.R.

52—612; 65—18, 48, 85, 335; 161—206